United States Patent [19]

Yamada

[11] Patent Number: 4,881,128

[45] Date of Patent: Nov. 14, 1989

[54] VIDEO CAMERA AND RECORDER SYSTEM WITH ILLUMINATION CONTROL FEATURES

[75] Inventor: Masahiro Yamada, North White Plains, N.Y.

[73] Assignee: Asahi Research Corporation, North White Plains, N.Y.

[21] Appl. No.: 192,849

[22] Filed: May 11, 1988

[51] Int. Cl.[4] ............................................. H04N 3/14
[52] U.S. Cl. ..................................... 358/228; 358/909
[58] Field of Search ................... 358/228, 213.19, 909; 354/129

[56] References Cited

U.S. PATENT DOCUMENTS

| | | | |
|---|---|---|---|
| 4,504,866 | 3/1985 | Saito | 358/909 |
| 4,608,605 | 8/1986 | Okino | 358/909 |
| 4,635,123 | 1/1987 | Masunaga et al. | 358/213.19 |
| 4,746,988 | 5/1988 | Nutting et al. | 358/909 |

Primary Examiner—Jin F. Ng
Assistant Examiner—Stephen Brinich
Attorney, Agent, or Firm—Neuman, Williams, Anderson & Olson

[57] ABSTRACT

A video movie camera system includes a synchronizing arrangement which is switched between stable on and off conditions to control operation of both a light source and recording apparatus during desired time intervals. The system also automatically controls the effective beam angle of a light source in accordance with the adjusted focal length of a zoom lens.

19 Claims, 5 Drawing Sheets

FIG. 3
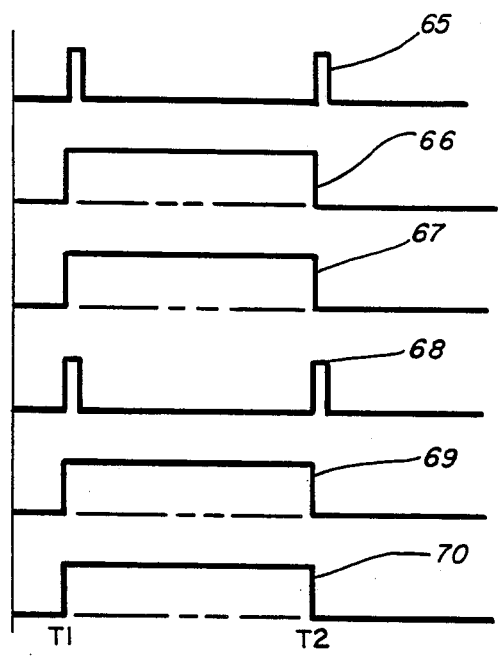
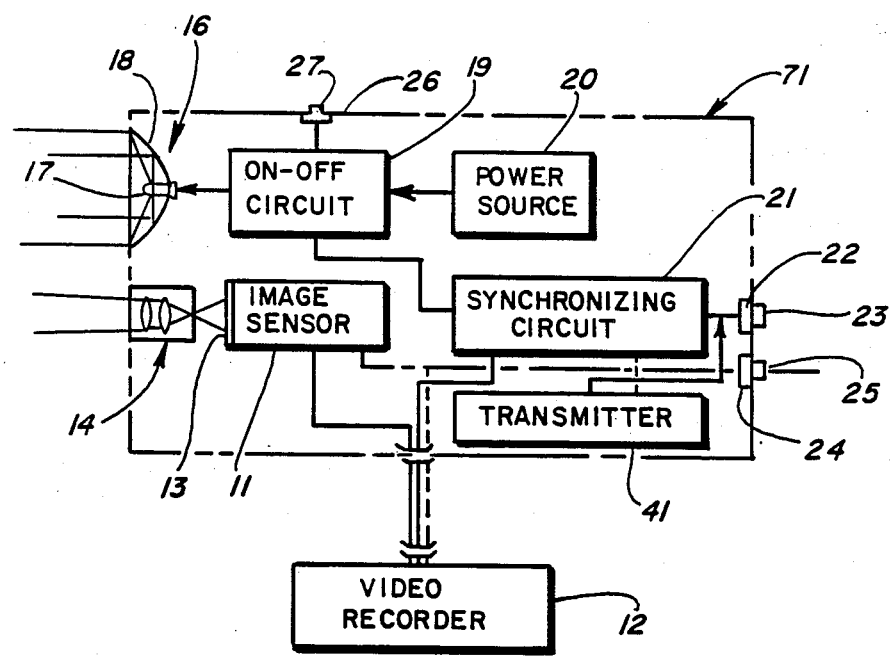
FIG. 4

VIDEO CAMERA AND RECORDER SYSTEM WITH ILLUMINATION CONTROL FEATURES

BACKGROUND OF THE INVENTION

1. Field of the Invention

This invention relates to a video camera and recording systems and more particularly to systems in which scene illumination is automatically controlled and correlated to the operation of camera and recording equipment in a manner such as to more readily and efficiently realize the purposes of the equipment and achieve the desired visual results. The systems of the invention are highly efficient, operate with minimal energy consumption and are highly reliable while being relatively simple in construction and operation and economically manufacturable.

2. Background of the Prior art

When operating video cameras of the prior art, it has oftentimes been necessary or desirable to use lights, as when operating in very dark environments or where the natural illumination of a scene to be viewed is not that desired for optimum visual effects. In such cases, lighting has generally been accomplished with lights which have been separate from a camera and/or mounted on top of a camera and which have been separately controlled. In a typical operation, one or more lights are turned on to illuminate a scene and then the camera is picked up and pointed at the scene, a recording button or control being then operated until recording of the scene is completed. Then the light or lights are turned off. This sequence of operations is frequently repeated many times during one period of use of the camera, and errors frequently occur, especially when trying to record the activities of children or other subjects who are not easily controlled to achieve the objectives of the camera operator.

SUMMARY OF THE INVENTION

This invention was evolved with the general object of providing video camera systems with improvements with respect to ease of operation and the attainment of optimum lighting under various conditions of operation. It is also an object of the invention to provide systems which are efficient and reliable while being economically manufacturable.

Important aspects of the invention relate to the recognition of sources of problems with prior systems. One source of problems is that the operation of lights is separate from the camera and recording operations, making operations difficult and cumbersome and leading to errors. Another source of problems is that the operation and functional characteristics of the lights are not correlated to the operation of the camera, making it difficult to obtain the desired results and leading to inefficencies.

In systems constructed in accordance with the invention, the illumination of a view region and the development and recording of video signals are under conjoint control with illumination being correlated to the camera and recording operations. A light control circuit is provided to permit use of a control signal to control energization of a light. In addition, a synchronizing circuit is provided which supplies the light control signal and simultaneously controls operation of a video signal recorder. No separate control of the light is required and the system is easy to operate. Since the light is energized only during the recording operation, energy consumption is minimized and the use of batteries for lighting is facilitated.

Preferably, the synchronizing circuit is operated by a conventional push button control and it includes a toggle type flip-flop to be switched from one state to the other in response to each push button actuation.

Another important feature relates to the use of the conjoint control features of the invention in combination with wireless control of one or more main or auxiliary light sources each of which may be so positioned with respect to a view region as to obtain the desired lighting while being energized only during the recording operation.

Further important features of the invention relates to the control of the beam projected by a light source and to controls effected in accordance with the position of adjustment of a zoom mechanism of a video camera. A light source is provided in which the relative positions of a lamp and a reflector or other focusing means are adjusted to obtain a beam having a variable angle of spread. Preferably, a control is provided to adjust the spread angle of the light beam in response to adjustments of the zoom mechanism of a camera so as to obtain matching characteristics. The illumination energy available from a lamp is used to maximum advantage and with greater efficiency, and the versatility of the system is greatly enhanced.

Additional features of the invention relate to the use constructions and circuits which provide the required operations in a highly efficient manner while being highly reliable and relatively simple and economically manufacturable.

These and other objects, features and advantages will become more fully apparent from the following detailed description taken in conjunction with the accompanying drawings.

BRIEF DESCRIPTION OF THE DRAWINGS

FIG. 3 graphically illustrates waveforms produced at various points of the circuits shown in FIG. 2;

FIG. 4 is a schematic diagram of a modified system constructed in accordance with the invention;

DESCRIPTION OF PREFERRED EMBODIMENTS

Figure 1:
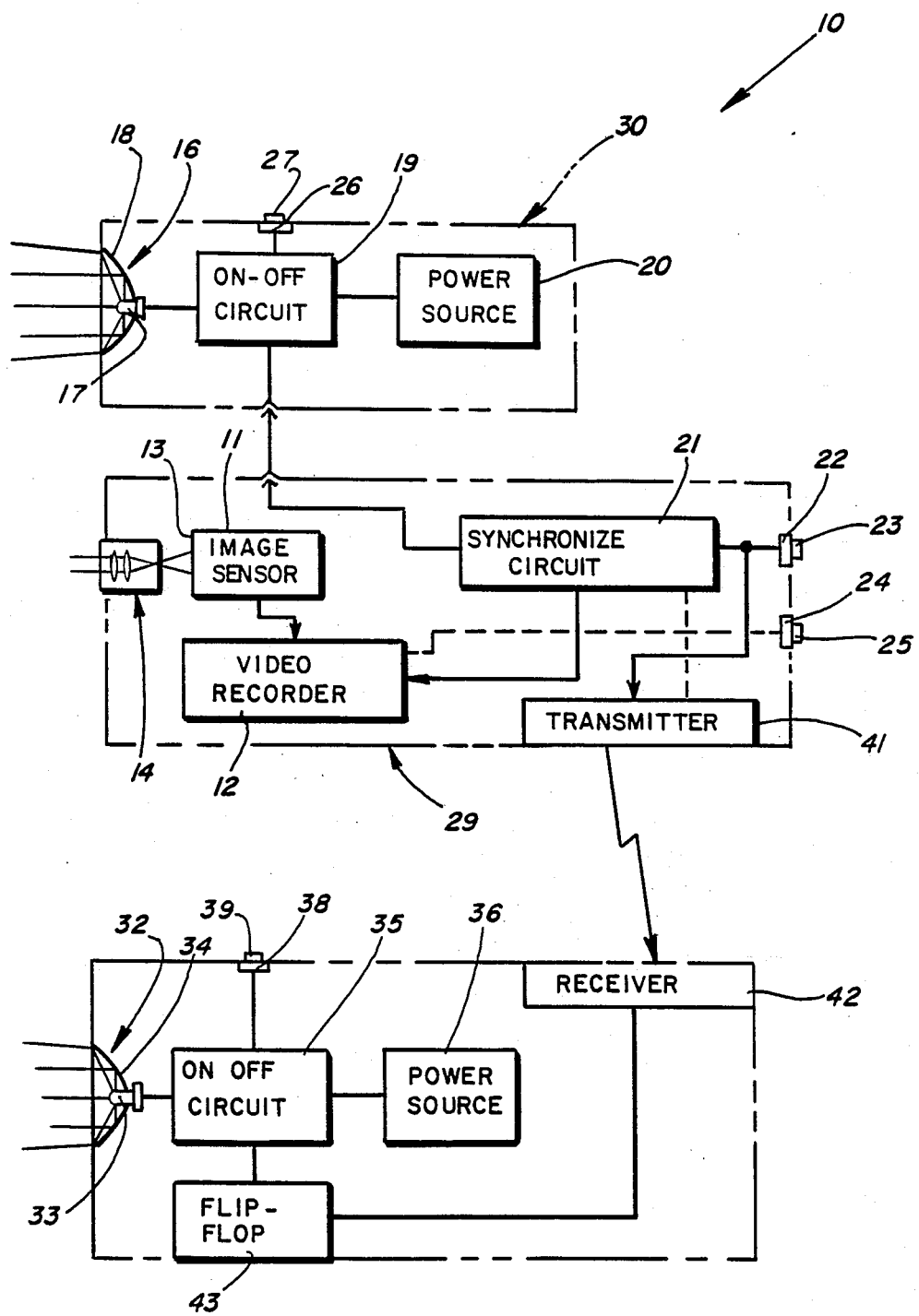
FIG. 1 is a schematic diagram of a video camera system constructed in accordance with the invention.

Reference numeral 10 generally designates a television camera system constructed in accordance with the principles of this invention. In the system 10 as illustrated, a video signal is devloped by an image sensor 11 and recorded by a recorder 12. The video signal is produced from an image at an image plane or region, indicated by reference numeral 13, a lens 14 being operative to project an image from a view region to the image region 13.

In accordance with the invention, means are provided for effecting conjoint control of the illumination of the view region and the development and recording of the video signal. As shown in FIG. 1, a light source 16 is provided which may include a lamp 17 and a reflector 18 as shown diagrammatically. The lamp 17 is connected through an on-off circuit 19 to a power source 20 and a synchronizing circuit 21 is provded for controlling the on-off circuit 19 and the video signal recorder 12.

Three manually operable switches are included for control of operation. The sycnhronizing circuit 21 is connnected to a recording control switch 22 which includes a manually operable control knob or push button element 23 for actuation thereof. A power switch 24 controls application of operating or control voltages within the image sensor 11, recorder 12 and synchronizing circuit 21. It is controlled by a manually operable control knob or push button element 25 and its control functions are performed in conventional fashion and are indicated by dotted lines in FIG. 1. A light control switch 26 is provided for controlling the on-off circuit 19 and is preferably a three-position switch controlled by an operating element 27 in the form of a rotatable knob.

In a typical operation, the power switch 24 is operated to an on position for supply of power to the image sensor 11, recorder 12 and synchronizing circuit 21 and the light switch is in or is moved to an automatic position. Then the recording switch 22 is operated and, through the syncrhonizing circuit 21, the on-off circuit 19 is operated to effect energization of the lamp 17 while simultaneously effecting operation of the recorder to record the video signal developed from the image of the view region illuminated by light from the source 16. The lamp 17 is thus energized only as necessary for recording of the video signal and, as a result, energy consumption is minimized. The arrangement also has the advantage that operation of the recorder 12 does not take place when illumination is inadequate. In addition, the illumination of the scene by the light source 16 provides an indication to the operator that the recording operation is taking place.

In conditions in which no lighting of a scene is necessary, the light switch 26 may be operated to an off position to prevent energization of the lamp 17. Light switch 26 may also preferably have an on position in which the lamp 17 is continuously energized, usable for illuminating a view region without operating the recorder 12, as during set up operations, for example.

In the system 10 as shown in FIG. 1, the image sensor 11, recorder 12, lens 14, synchronizing circuit 21 and switches 23 and 24 are part of a unit 29 while the light source 16, on-off circuit 19, power source 20 and switch 26 are part of a unit 30. Units 29 and 30 are indicated diagrammatically by broken lines. They may be physically separate from each other and electrically connected by a connecting cable 31. Alternatively, they may be physically connected and may also be directly connected electrically through mating connectors, for example.

As also shown in FIG. 1, an auxiliary light source 32 may be provided which includes a lamp 33 and a reflector 34. Lamp 33 is connected through an on-off circuit 35 to a power source 36, the on-off circuit 35 being connected to a switch 38 which is like the switch 26 and which includes an operating element 39.

Wireless signal transmission circuits are provided for control of the on-off circuit 35 from the synchronizing circuit 21. In particular, a transmitter 41 is controlled from the synchronizing circuit 21 and a receiving circuit 42 is connected to a flip-flop 43 for control of the on-off circuit 35. The use of a wireless control permits greater flexibility and convenience in the positioning of a light source with respect to a view region. The use of a plurality of light sources, with either wireless control or with cable connections, is advantageous in eliminating shadow effects and providing more uniform light or otherwise obtaining optimum lighting. It will be understood that as many auxiliary light sources may be used as desired in particular circumstances, with or without wireless control.

Figure 2:
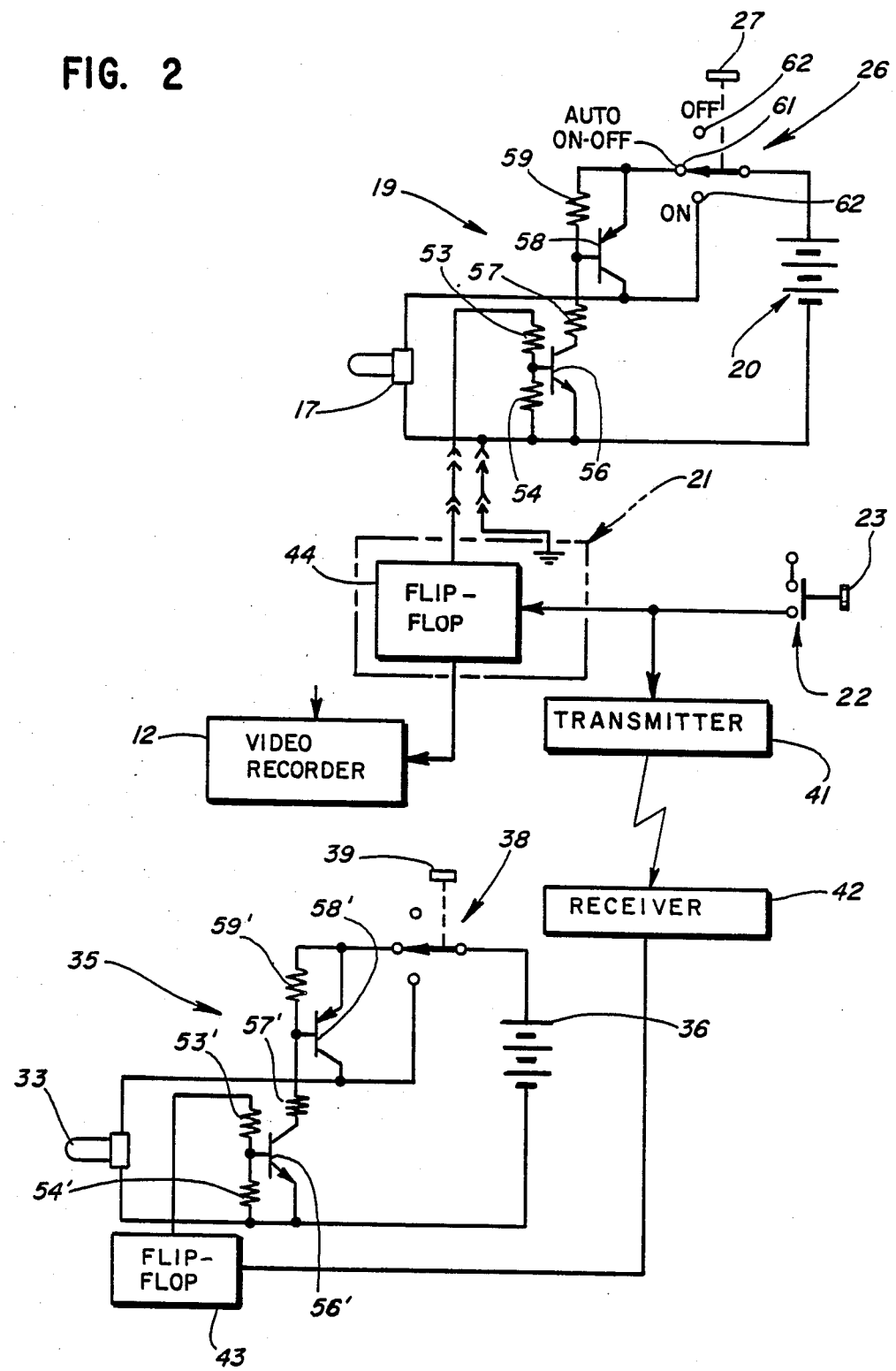
FIG. 2 is a circuit diagram, showing details of circuitry of elements shown in block form in FIG. 1.

FIG. 2 illustrates important features of the circuitry in more detail. As shown, the synchronizing circuit 21 includes a flip-flop 44 which may preferably be a toggle or "T" type of flip-flop controlled from the switch 22. An output of the flip-flop 44 is connected through a resistor 45 to a terminal 46 of the illustrated unit 29. Terminal 46 is connected to a terminal 48 of the illustrated unit 30, either directly or through a conductor 49 of the connecting cable 31 which may also include a conductor 50 to connect ground terminals 51 and 52 of the units 29 and 30.

In unit 30, a pair of resistors 53 and 54 are connected in series between terminals 48 and 52, the junction therebetween being connected to the base of a control or driver transistor 56 which has a grounded emitter and which has a collector connected through a resistor 57 to the base of a power transistor 58, a resistor 59 being connected between the base and emitter electrodes of the power transistor 58. It is noted that transistors 56 and 58 are respectively NPN and PNP transistors and are connected in a Darlington configuration. They may be transistors in a common envelope or package, if desired. The collector of power transistor 58 is connected through the lamp 17 to ground and is also connected to an "ON" terminal 60 of the light switch 26. The emitter of power transistor 58 is connected to an "AUTO ON-OFF" terminal 61 of the light switch 26 which has a third "OFF" terminal 62 having no connection thereto and which also has a movable contact 64 selectively connectable to the "ON", "AUTO ON-OFF" and "OFF" terminals 60, 61 and 62. The movable contact 64 is connected to the positive terminal of a battery which forms the power source 20 in the illustrated embodiment.

In operation, the flip-flop 44 is triggered from one state to the other in response to each operation of the switch 22. In one state, the output thereof is at or near ground potential and neither the light source 16 nor the recorder 12 is activated. In the other state, the recorder 12 is activated and, at the same time, a high signal is applied through resistors 45 and 53 to the base of the transistor 56 to initiate conduction of the transistor 56 which thereby pulls the potential of the base of the transistor 58 to a low level, thereby initiating conduction of the power transistor 58. The lamp 17 is then energized through the power transistor 58, assuming that the selector switch 26 is in the "AUTO ON-OFF" position as illustrated. If the switch 26 is in the "OFF" position, the lamp 17 is not energized and if the switch 26 is in the "ON" position, the lamp 17 is continuously energized.

Also, when the switch 22 is operated, the transmitter 41 is operated to send a signal to the receiver 42 to operate the flip-flop 43 which functionally corresponds to the flip-flop 44. The output of the flip-flop 43 is connected to circuitry which is substantially identical to that of the unit 30 as above described, corresponding components being indicated by primed numbers.

FIG. 3 graphically illustrates the waveforms at various points of the circuitry as described. The output of the switch 22 with successive operations thereof is indicated by reference numeral 65 and is in the form of pulses as shown. At the leading edge of the first pulse, the output of the flip-flop 44 indicated by reference numeral 66, is shifted from a low state to a high state. At the leading edge of the next pulse of waveform 65, the output of the flip-flop 44 is shifted back to the low state. Waveform 67 is that of the voltage applied to the lamp 17 and corresponds to the waveform 66. Waveform 68 indicates the pulse is applied through the transmitter 41 and receiver 42 to the flip-flop 43. Waveform 69 is that of the output of the flip-flop 43 and waveform 70 is the waveform of the voltage applied to the lamp 33 of the auxiliary unit.

FIG. 4 illustrates a modified arrangement in which the image sensor 11, lens 14 and light source 16 are physically associated in one unit 71, as indicated by a broken line rectangle, while the recorder 12 is physically separate therefrom, a suitable flexible connecting cable being provided between the unit 71 and the recorder 12. The unit 71, as shown, also includes the on-off circuit 19, the synchronizing circuit 21, the switches 22, 24 and 26 and the transmitter 41. As shown, it also includes the power source 20, but it will be understood that to reduce the weight of the unit 71, the power source 20 may be physically associated with the recorder 12 or may otherwise be separate from the unit 71 and connected thereto through a suitable flexible cable.

Figure 5:
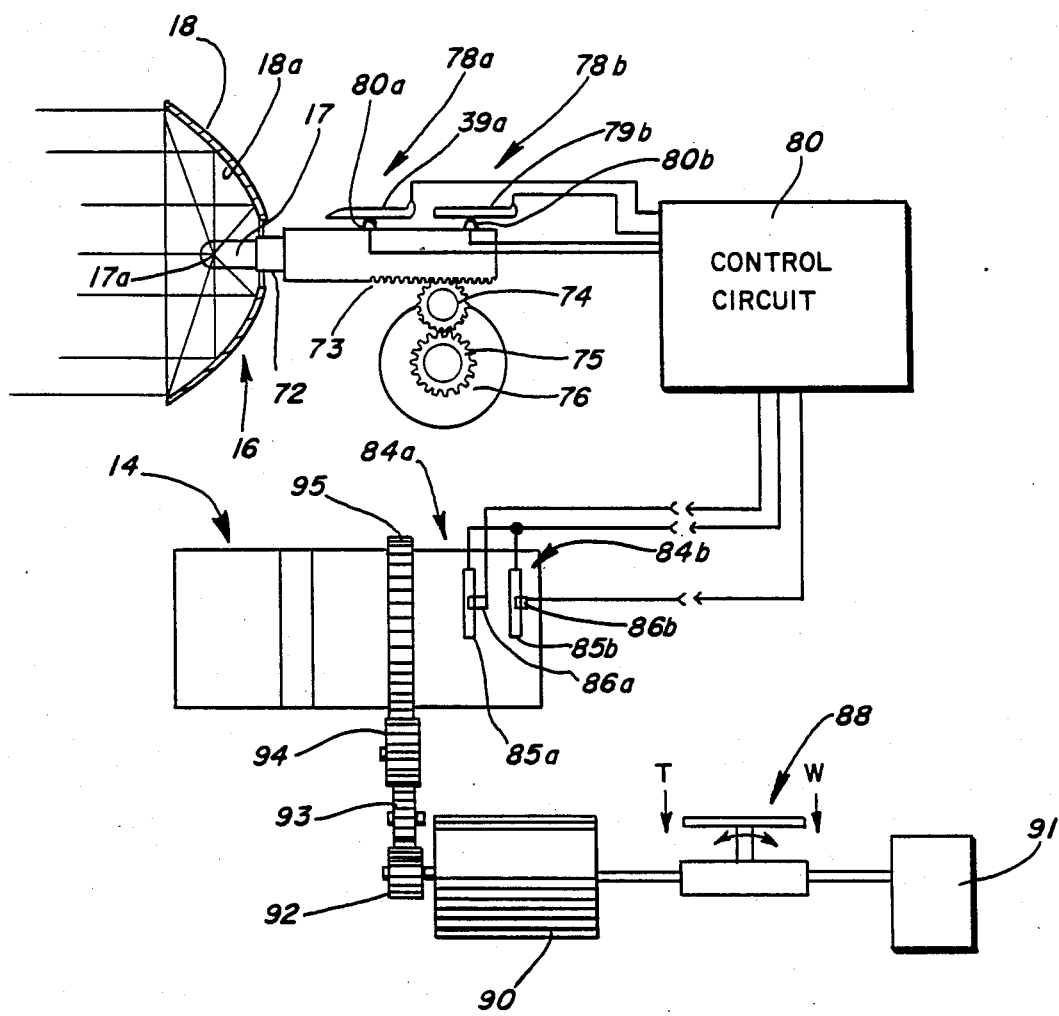
FIG. 5 is a schematic diagram of an arrangement usable in the systems of FIGS. 1 or 4 for conjoint control of a light source and a zoom mechanism.

FIG. 5 illustrates an arrangement for controlling a light source in accordance with the position of adjustment of a zoom mechanism of a camera, in accordance with the principles of this invention. The arrangement of FIG. 3 may be incorporated in the system as illustrated in FIGS. 1-3. As shown, the lamp 17 is mounted in a socket 72 which is adjustably movable in the direction of the axis of the reflector 18, to adjust the position of the filament of the lamp 17, indicated by reference numeral 17a, relative to the reflector 18. The reflector 18 may be a parabolic reflector, for example, having a parabolic surface indicated by reference numberal 18a.

When the filament 17a is at the focus of the parabolic surface 18a, the light from the lamp 17 is concentrated into a narrow beam but when the filament 17a is moved away therefrom the beam is proportionately widened. In accordance with the invention, the position of the lamp 17 is changed in accordance with the position of adjustment of the lens 14. As shown, the socket 72 is secured to a rack member 73 while a pinion 74 is meshed with the rack member 73 and with a gear 75 driven by a control motor 76. The position of the socket 72 is sensed by a variable resistors 78a and 79b which include resistance elements 79a and 79b extending in a direction parallel to the direction of movement of the socket and which include contacts 80a and 80b engaged with the resistance elements 79a and 79b and carried by the socket 72.

A control circuit 81 compares the position signal from the variable resistors 78a and 79b with position signals from a zoom lens assembly 82 which includes the lens 14. The control circuit 81 energizes the motor 76 to effect operation thereof to a position at which such signals are balanced, so that the lamp is positioned to obtain a light beam with a spread angle corresponding to the zoom lens angle. In the arrangement as illustrated, the zoom lens position signals are developed by a variable resistors 84a and 84b which include resistance elements 85a and 85b extending arcuately about the axis of the zoom lens assembly 82 and which are engaged by a contact 86 movable relative thereto, in an arcuate path about the axis of the assembly 82.

As shown, a motorized control arrangement of known form may be provided for adjusting the zoom angle or effective focal length of the lens 14 in response to movement of an actuator 87 of a zoom switch 88, including a motor 90 connected through the switch 88 to a battery 91, the motor 90 being arranged to operate the zoom assembly through a train of gears 92, 93, 94 and 95.

Figure 6:
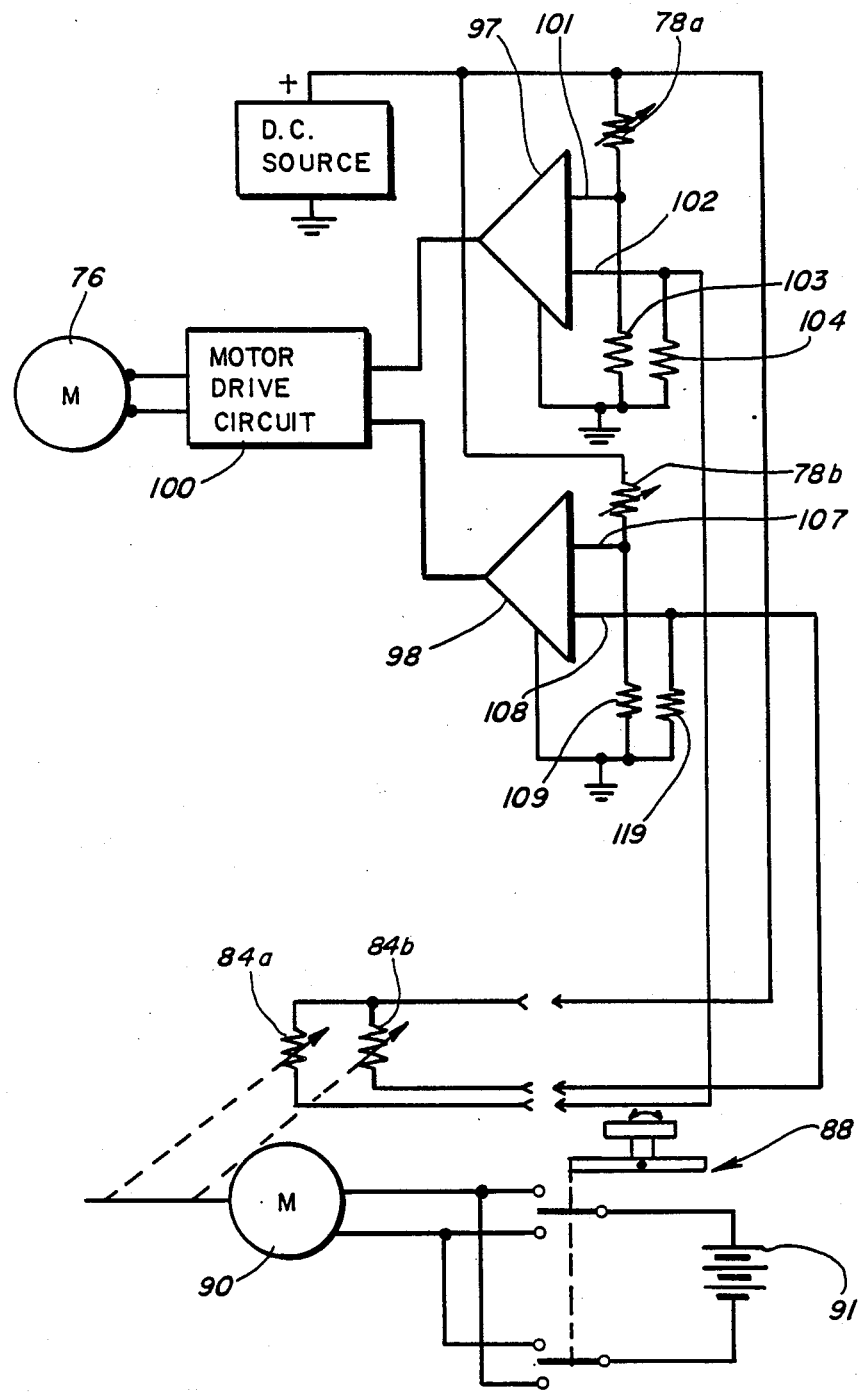
FIG. 6 is a circuit diagram showing details of circuitry of the arrangement of FIG. 5.

FIG. 6 illustrates a circuit arrangement which includes two comparators 97 and 98 having outputs connected to a drive control circuit 100 for the light angle control motor. When comparator 97 applies an output signal to the circuit 100, the motor 76 is driven in a direction to reduce the effective angle of the projected light beam. When comparator 98 applies an output signal to the circuit 100, the motor 76 is driven in the reverse direction to produce a wider effective angle of the projected light beam. The comparator 97 has two inputs 101 and 102 which are connected through fixed resistors 103 and 104 to ground and through the variable resistors 78a and 84a to the positive output terminal 105 of a voltage supply 106. When in response to a shift in the setting of the zoom lens 14 toward the telephoto position, the voltage at input 101 becomes greater than that at input 102, the comparator 97 develops an output signal to reduce the angle of the light beam, continuing until the voltage at input 101 becomes equal to that at input 102.

When the setting of the zoom lens 14 is shifted toward the wide angle position, the comparator 98 operates in a similar fashion. It has two inputs 107 and 108 connected through fixed resistors 109 and 110 to ground and through variable resistors 78b and 84b to the positive voltage supply terminal 105. When in response to to a shift in the setting of the zoom lens 14 toward the wide angle position, the voltage at input 107 becomes greater than that at input 108, the comparator 98 develops an output signal to increase the angle of the light beam, continuing until the voltage at input 107 becomes equal to that at input 108.

As shown in FIG. 6, the zoom switch 88 is simply a double pole, double throw switch having a neutral position and operative to energize the zoom control motor 90 in either direction, to move the lens toward the telephoto position or the wide angle position. It will be understood that the system of the invention is not limited telephoto position or the wide angle position. It will be understood that the system of the invention is not limited to a motorized zoom control system and is also usable with a manually controlled zoom. It will also be understood that other forms of control circuit arrangements may be used.

It will be further understood that other modifications and variations may be effected without departing from the spirit and scope of the novel concepts of this invention.

I claim:

1. A video movie camera system for operation for prolonged periods of time of indefinite length under operator control, comprising: means including image sensor means for developing a video signal corresponding to images developed in an image region, lens means for projecting images from a view region to said image region, recording means coupled to said image sensor means for recording said video signal, electrically energizable light source means for illuminating said image region, an electrical power source, light source control means for controlling energization of said light source means from said electrical power source, and synchronizing means for controlling both said light source control means and said recording means for operating only during desired time intervals to effect energization of said light source means and illumination of said view region and to substantially simultaneously effect concurrent operation of said recording means, said energization means and said illumination means for recording of the video signal developed from the image of the view region illuminated by said light source means over prolonged periods of time and under the control of the operator, said synchronizing means including a switching means operable between two stable conditions on and off and said switching means being operated from said off condition to said on condition at the beginning of each period of time selected by an operator and from said on condition to said off condition at the end of each period of time selected by an operator.

2. A video camera system as defined in claim 1, including manually operable switch means for controlling said synchronizing means.

3. A video camera system as defined in claim 1, including means for decoupling said light source control means from said synchronizing means for permitting operation of said image sensor means and said recording means without effecting energization of said light source means.

4. A video camera system as defined in claim 1, said system including first and second physically separate portions with said image sensor means and recording means in said first portion and said light source means, power source and light source control means in said second portion, said synchronizing means comprising wireless signal transmission means operative between said first and second portion.

5. A video camera system as defined in claim 4, said wireless signal transmission means including a transmitter in said first portion and a receiver in said second unit.

6. A video camera system as defined in claim 1, said system comprising an additional light source means, an additional electrical power source, and an additional light source control means for controlling energization of said additional light source means from said additional power source, said synchronizing means being arranged for also controlling said additional light source control means to effect energization of said additional light source means during operation of said recording means.

7. A video camera system as defined in claim 1, said system including first and second physically separate portions with said image sensor means, said light source means and said light source control means in said first portion and with said recording means in said second portion.

8. A video camera system, comprising: means including image sensing means for developing a video signal corresponding to an image region, lens means for projecting an image from a view region to said image region, recording means coupled to said image sensor means for recording said video signal, electrically energizable light source means for illuminating said image region, an electrical power source, light source control means for controlling energization of said light source means from said electrical power source, and synchronizing means for controlling both said light source control means and said recording means for operating only during desired time intervals to effect energization of said light source means an illumination of said view region and to substantially simultaneously effect operation of said recording means for recording of the video signal developed from the image of the view region illuminated by said light source means, wherein said synchronizing means comprises flip-flop means operated from an off condition to an on condition during each of said desired time intervals, means coupling said flip-flop means to said recording means, and means coupling said flip-flop means to said light source control means.

9. A video camera system, comprising: means including image sensing means for developing a video signal corresponding to an image region, lens means for projecting an image from a view region to said image region, recording means coupled to said image sensor means for recording said video signal, electrically energizable light source means for illuminating said image region, an electrical power source, light source control means for controlling energization of said light source means from said electrical power source, and synchronizing means for controlling both said light source control means and said recording means for operating only during desired time intervals to effect energization of said light source means and illumination of said view region and to substantially simultaneously effect operation of said recording means for recording of the video signal developed from the image of the view region illuminated by said light source means, wherein said light source control means comprises power transistor means coupled in series between said electrical power source and said light source, and drive signal means responsive to a control signal from said synchronizing means for applying a drive signal to said transistor means to operate said transistor means to a conductive condition and energize said light source means.

10. A video camera system as defined in claim 9, wherein said drive signal means of light source control means includes drive transistor means.

11. A video camera system as defined in claim 9, wherein said light source control means comprises manually operable switch means connected in parallel relation to said power transistor means for permitting continuous energization of said light source means under control of said manually operable switch means.

12. A video camera system as defined in claim 9, wherein said synchronizing means comprises flip-flop means operated from an off condition to an on condition during each of said desired time intervals, means coupling said flip-flop means to said recording means, and means coupling said flip-flop means to said light source control means for applying said control signal to said drive signal means.

13. A video camera system, comprising: camera means including image sensor means for developing a video signal corresponding to an image developed in an image region, and lens means for projecting an image from a view region to said image region, zoom means for adjusting the effective focal length of said lens means, electrically controllable light source means for illuminating said image region, and light source control means coupled to said zoom means for control of said light source means in accordance with the adjusted focal length of said lens means.

14. A video camera system as defined in claim 13, said light source control means being arranged to control the effective beam angle of light projected from said light source means.

15. A video camera system as defined in claim 14, wherein said light source means comprises a lamp, light focusing means for concentrating light from said lamp into a beam, and means for adjusting the position of said focusing means relative to said lamp to adjust the effective beam angle of light projected from said lamp and said focusing means.

16. A video camera system as defined in claim 15, wherein said focusing means comprises a reflector.

17. A video camera system as defined in claim 15, wherein said light source control means comprises means for developing a first electrical signal corresponding to the position of adjustment of said zoom means, means for developing a second electrical signal corresponding to the position of adjustment of said light focusing means, and circuit means for comparing said first and second signals for developing a control signal for control of said focusing means.

18. A video camera system as defined in claim 17, wherein said light source control means further comprises electromechanical adjustment means responsive to said control signal to adjust said light focusing means.

19. A video camera system as defined in claim 13, including recording means coupled to said image sensor means for recording said video signal, an electrical power source, said light source control means being arranged for controlling energization of said light source means from said electrical power source, and synchronizing means for controlling both said light source control means and said recording means for operating only during desired time intervals to effect energization of said light source means and illumination of said view region and to substantially simultaneously effect operation of said recording means for recording of the video signal developed from the image of the view region illuminated by said light source means.

* * * * *